UNITED STATES PATENT OFFICE.

HYMAN ELI GOLDBERG, OF CHICAGO, ILLINOIS.

CONDUCTIVE INK.

1,034,104.      Specification of Letters Patent.      Patented July 30, 1912.

No Drawing.      Application filed August 4, 1911. Serial No. 642,246.

*To all whom it may concern:*

Be it known that I, HYMAN ELI GOLDBERG, a citizen of the United States, residing at Chicago, in the county of Cook and State of Illinois, have invented a certain new and useful Conductive Ink, of which the following is a specification.

My invention relates to the production of an ink which is electrically conductive when dry.

I have discovered that metals in the colloidal form in a volatile liquid may be employed as an ink, and that when spread upon a surface and the volatile element evaporated, there is left a metallic layer which is continuous, coherent and electrically conductive. To illustrate, I take silver in colloidal form diffused in water or other liquid, the proportions varying to suit the means by which the mixture is to be applied to the paper. If a writing pen is to be used the mixture is made fluid enough to readily flow from the pen. If a stamp or type is to be used the mixture may be made thicker, for instance by the admixture of glycerin. I find that this fluid is permanent in the sense that no precipitate or sediment is formed at the bottom after hours of standing. When it has dried upon the sheet of paper the metal becomes non-colloidal; that is, insoluble in accordance with the properties of colloidal metals. Moreover, the line or layer is coherent and continuous and electrically conductive. For example, a line of the fluid drawn by an ordinary pen will conduct electric current.

By a metallic "colloid" I mean pure metal (not salt of metal) in such finely divided form as not to precipitate out under the action of gravity from the liquid in which it is diffused. Such metallic colloids can be prepared in a variety of ways. For example, many metals, among them silver, may be rendered colloidal by forming a direct current arc under water between terminals consisting of the metal to be rendered colloidal.

Other conducting material in colloidal form may be substituted for the silver, for instance, gold, platinum, copper, graphite. Other liquids may be substituted for the water, for example, alcohol, ether, glycerin, acetone and similar hydrocarbons.

I find generally that the marks left upon the paper by a metallic colloid are colored and not black, thus silver colloid will produce gold colored marks or even grass green ones. Colloidal graphite produces black or grayish black marks.

Generally speaking I find that the most conductive metallic colloids are superior in their electrical conductivity to graphite colloid but ordinarily black marks are preferable to colored ones. I, therefore, sometimes employ the pure metal, particularly silver, or again use graphite, or sometimes combine the two with each other and thereby obtain a fluid which has good conductivity, and appears substantially black.

As the colloidal graphite I have used Acheson deflocculated graphite, which I find is colloidal in its nature. This is described and claimed in my copending application filed October 28th, 1910, Serial Number 589,565.

Having thus described my invention, what I claim as new, and desire to secure by Letters Patent, is:

1. A visible ink composed of two elements, one being a volatile liquid, and the other a metal in colloidal form in said liquid.

2. A visible ink composed of two elements, one being a volatile liquid, and the other a non-oxidizing metal in colloidal form diffused in said liquid.

3. A visible ink composed of two elements, one being a volatile liquid, and the other silver in colloidal form diffused in said liquid.

4. A visible ink composed of metal and graphite both in colloidal form, and a volatile liquid wherein the metal and graphite are diffused.

In witness whereof, I have hereunto subscribed my name in the presence of two witnesses.

HYMAN ELI GOLDBERG.

Witnesses:
MARGARET D. ROBB,
MAX S. ROSENZWEIG.